(12) United States Patent
Barsness et al.

(10) Patent No.: US 8,537,662 B2
(45) Date of Patent: *Sep. 17, 2013

(54) GLOBAL DETECTION OF RESOURCE LEAKS IN A MULTI-NODE COMPUTER SYSTEM

(75) Inventors: Eric L. Barsness, Pine Island, MN (US); David L. Darrington, Rochester, MN (US); Amanda E. Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,634

(22) Filed: Jun. 8, 2012

(65) Prior Publication Data

US 2012/0246509 A1  Sep. 27, 2012

Related U.S. Application Data

(63) Continuation of application No. 12/244,062, filed on Oct. 2, 2008, now Pat. No. 8,203,937.

(51) Int. Cl.
*G01R 31/08* (2006.01)
(52) U.S. Cl.
USPC .......................................... 370/221; 370/216
(58) Field of Classification Search
USPC .................................................. 370/221, 216
See application file for complete search history.

(56) References Cited

U.S. PATENT DOCUMENTS

| 7,774,741 | B2 | 8/2010 | Sridharan et al. |
| 7,827,375 | B2 | 11/2010 | Abrashkevich et al. |
| 8,203,937 | B2 * | 6/2012 | Barsness et al. .............. 370/221 |
| 2006/0048017 | A1 | 3/2006 | Anerousis et al. |
| 2006/0173877 | A1 | 8/2006 | Findeisen et al. |
| 2006/0212332 | A1 | 9/2006 | Jackson |
| 2007/0271418 | A1 | 11/2007 | Sridharan et al. |
| 2007/0294697 | A1 | 12/2007 | Theimer et al. |
| 2008/0288746 | A1 | 11/2008 | Inglett et al. |
| 2009/0307703 | A1 | 12/2009 | Archer et al. |
| 2010/0085870 | A1 | 4/2010 | Barsness et al. |
| 2010/0085871 | A1 | 4/2010 | Barsness et al. |

OTHER PUBLICATIONS

Fadallah et al., Parallel Computing Methods and Environments, Proceedings of PARELEC 2000, International Conference on Parallel Computing in Electrical Engineering, Aug. 27-30, 2000, IEEE, 6 pages.

* cited by examiner

*Primary Examiner* — Mark Rinehart
*Assistant Examiner* — Angel Brockman
(74) *Attorney, Agent, or Firm* — Patterson & Sheridan LLP (57) ABSTRACT

A process is disclosed for identifying and recovering from resource leaks on compute nodes of a parallel computing system. A resource monitor stores information about system resources available on a compute node in a clean state. After the compute node runs a job, the resource monitor compares the current resource availability to the clean state. If a resource leak is found, the resource monitor contacts a global resource manger to remove the resource leak.

20 Claims, 6 Drawing Sheets

GLOBAL DETECTION OF RESOURCE LEAKS IN A MULTI-NODE COMPUTER SYSTEM

CROSS-REFERENCE TO RELATED APPLICATIONS

This application is a continuation of co-pending U.S. patent application Ser. No. 12/244,062, filed Oct. 2, 2008, which is herein incorporated by reference in its entirety.

BACKGROUND OF THE INVENTION

1. Field of the Invention

Embodiments of the invention generally relate to improving system utilization on a massively parallel computer system. More specifically, embodiments of the invention are related to recovering from a resource leak on a compute node (or nodes) of a multi-node computer system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

Each compute node in a massively parallel computing system may be configured to run multiple computing jobs. The jobs can be part of a single computing task or independent from one another. In some cases, a job may leave behind unwanted remnants, for example, a job may leave behind orphaned processes or temporary files stored in memory. The presence of such artifacts on a given node reduces the resources available to future computing jobs scheduled to execute on that node. Although the impact on a single node may be small, when a computing job executed on thousands of nodes creates a resource leak, the performance of the entire computing system may be substantially reduced.

SUMMARY OF THE INVENTION

One embodiment of the invention includes a method for correcting resource leaks that occur on a parallel computing system having a plurality of compute nodes. The method may generally include selecting a first compute node, of the plurality of compute nodes, determining a current resource availability level of the first compute node, and comparing the current resource availability level to an expected resource availability level. Upon determining the current resource availability level differs from the expected resource availability level by a specified magnitude, one or more computing jobs completed by the first compute node is identified and a corrective action is invoked to restore the first compute node to a clean state characterized by an absence resource leaks on the first compute node.

In a particular embodiment, the method may further include identifying at least a second compute node, of the plurality, that also executed the identified one or more computing jobs and determining whether a resource leak has occurred on the second compute node. Upon determining that a resource leak has occurred on the second compute node, the corrective action is invoked to restore a resource availability level of the second compute node to a clean state.

Another embodiment of the invention includes a computer-readable storage medium containing a program which, when executed, performs an operation for correcting resource leaks that occur on a parallel computing system having a plurality of compute nodes. The operation may generally include selecting a first compute node, of the plurality of compute nodes, determining a current resource availability level of the first compute node, and comparing the current resource Upon determining the current resource availability level differs from the expected resource availability level by a specified magnitude, one or more computing jobs completed by the first compute node is identified and a corrective action is invoked to restore the first compute node to a clean state characterized by an absence resource leaks on the first compute node.

Still another embodiment of the invention includes a parallel computing system having a plurality of compute nodes, each having at least a processor and a memory and a program, which, when executed on a first compute node, of the plurality, is configured to correct resource leaks that occur on the parallel computing system. The program may be configured to select a first compute node, of the plurality of compute nodes, determine a current resource availability level of the first compute node, and compare the current resource availability level to an expected resource availability level. Upon determining the current resource availability level differs from the expected resource availability level by a specified magnitude, the program may identify one or more computing jobs completed by the first compute node is identified and invoke a corrective action to restore the first compute node to a clean state characterized by an absence resource leaks on the first compute node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques that enhance node resource management on a parallel computing system by monitoring compute nodes for resource leaks and restoring such nodes to a known "clean" state when a resource leak is identified. Doing so may allow a massively parallel computing system to identify and recover from resource leaks without unduly impacting overall system performance.

In one embodiment, a compute node may evaluate the resources available on that node to determine whether a resource leak has occurred. For example, the compute node may accomplish this through a background process, also known as a "daemon," or by using routines provided by the node's operating system. The compute node uses a resource monitor to evaluate the available resources and determine whether a resource leak has occurred. As part of an initial program load, the resource monitor may be configured to collect an initial set of data reflecting the resources available on that node in a "clean" state, e.g., the amount of available memory, the available disk space, communication resources and the like. After the compute node completes a job (or jobs), and performs any necessary clean-up (e.g., freeing allocated memory, deleting temporary files, tearing down communication links or deleting buffers used to store network data, etc.), the resource monitor may compare data reflecting the resources then currently available with the initial set of data. If the resource monitor determines that a substantial percentage of resources remain unavailable, then a resource leak may exist. In such a case, the resource monitor may be configured to perform a corrective action with respect to that node. For example, the resource monitor may notify a global resource manager on a service node. The resource manager may remove the node from a pool of available nodes and invoke a procedure to restore the node to a known "clean" state. For example, the resource manager may simply re-boot the compute node. In an alternative case, however, the compute node may be returned to a clean state using a stored image of a node-state (e.g., a set of memory and register settings). Once the node is restored to a clean state, the resource manager returns the node to the pool of available nodes.

In an alternative approach, the global resource manager may poll idle nodes (or randomly sample idle nodes) to determine whether a resource leak may have occurred. The resource manager may poll a compute node to obtain resource availability data at boot-time (or other "clean" point) and subsequently obtain current resource availability data for the compute node. Once a resource leak is identified by comparing the resource availably data, the resource manager may remove the node from the pool of available nodes and restore the node to a "clean" state, as described above. This approach may be useful where many nodes run the same application program, e.g., to process different data sets in parallel. In such a case, if a resource leak occurs on one compute node as a result of running a job, it may be likely to occur on other nodes as well. Accordingly, the resource manager may determine whether a resource leak has occurred on other compute nodes that have run the same computing job.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media, also referred to as non-transitory computer-readable media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
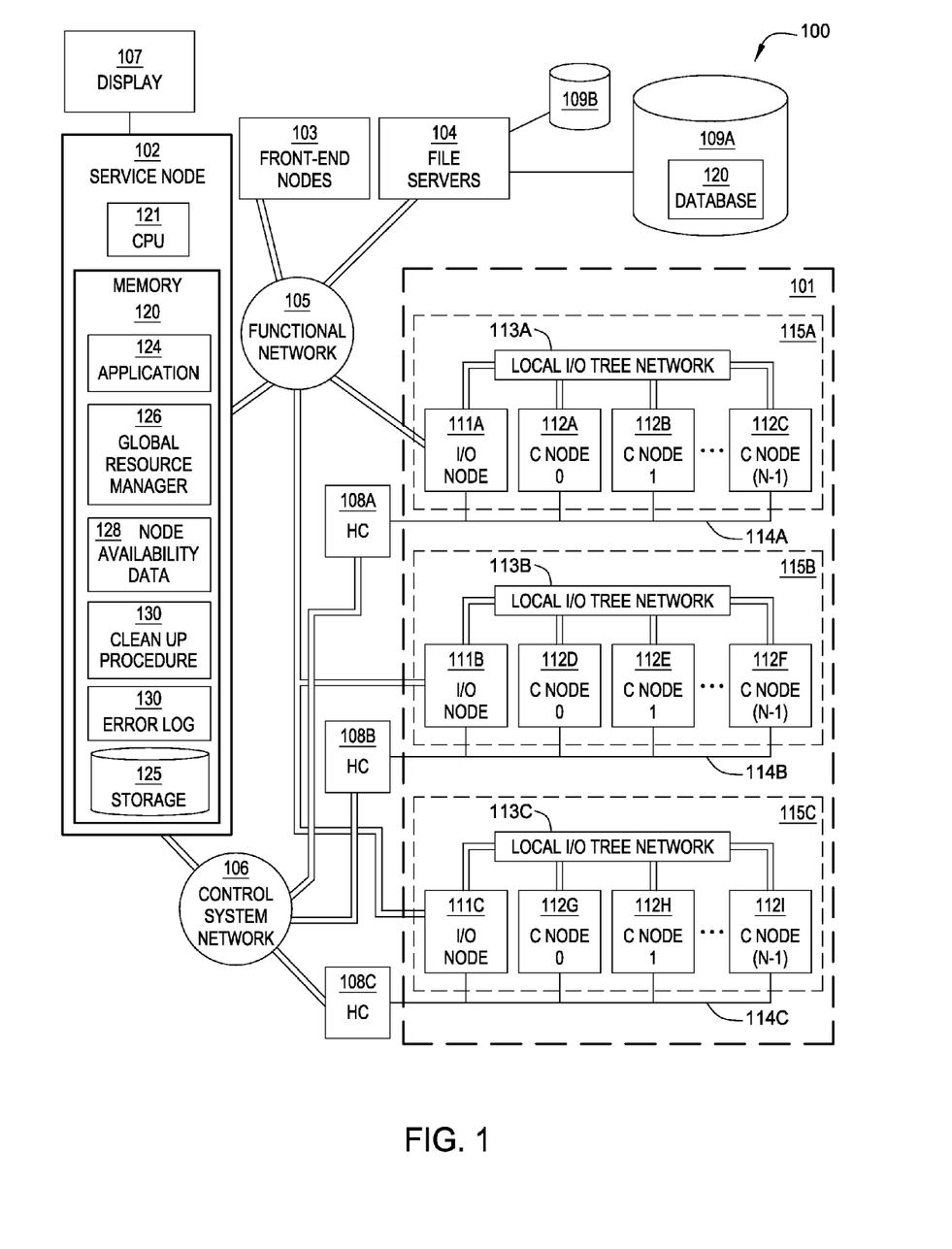
FIG. 1 is a block diagram illustrating components of a massively parallel computer system, according to one embodiment of the present invention.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1 K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, a memory 120, and local storage 125. An attached console 107 (e.g., a keyboard, mouse, and display) may be used to initialize computing jobs on compute core 101. Service node 102 may also include an internal database which maintains state information for the compute nodes in core 101, and an application 124 which may be configured to, among other things, control the allocation of hardware in compute core 101 to different computing jobs, direct the loading of data on compute nodes 111, migrate process running on one of compute nodes 112 to another, and perform diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application.

Illustratively, memory 120 of service node 102 includes an application 124, a global resource manager 126, a node availability data structure 128, a cleanup procedure 130, and an error log 132. Application 124 may be configured to communicate with a distributed application running on compute core 101. For example, consider an in-memory database distributed across a pool of compute nodes. In such a case, each node could perform an identical operation on a different portion of database data, e.g., each node could store distinct portion of rows of a database table. And Application 124 may be used to submit a query to the compute nodes 112 in the pool, and in response, each compute node 112 returns any data records responsive to the query.

In some cases, an application running on one of the compute nodes 112 could develop a resource leak as a result of executing the database query. Generally, a resource leak occurs when a job completes (or terminates) running on one of the compute nodes 112 without freeing resources used while performing the job. Similarly, an application running on a compute node 112 may continue to request or allocate resources without freeing them as appropriate. For example, an application could create a new temporary file used to store intermediate results each time a database query is evaluated. If the application failed to delete the temporary file after completing given database operation, the space available to the compute node would slowly dwindle. Further, once the application terminates, the temporary files could remain. Of course, the example of a database is just one example of an application which may be executed on a massively parallel system. Similarly, parallel applications running on the compute nodes 112 frequently communicate with one another using data communications networks provided by the parallel computing system. For example, one compute node 112 may create a communications link by establishing a socket connection with another compute node 112. In such a case, the compute node 112 may acquire exclusive control over a communications or network resource, e.g., one of the point-to-point links between two compute nodes 112 or may create (or request allocation of) buffers stored in memory or provided by the communication hardware. If any of these resources are not properly cleaned-up by the application once an application completes executing, a resource leak may occur. In such a case, when a subsequent application running on the compute node 112 attempts to access a communications resource, that application may find the resource unavailable.

In one embodiment, global resource manager 126 may be configured to monitor the compute nodes 112 for resource leaks. The global resource manager 126 could be a process running in the background, also known as a "daemon," a separate application, or routines provided by the operating system of service node 102. When global resource manager 126 detects a resource leak on one of the compute nodes 112, the global resource manager 126 may update a node availability data structure 128, preventing new jobs from being assigned to that compute node while the resource leak is present. Global resource manager 126 then invokes clean up procedure 130 to remove the resource leak. Once removed, the global resource manager 126 then updates the node availability data structure 128 a second time so that the compute node 112 is available to be assigned new jobs. Additionally, the global resource manager 126 may record information about the resource leak and the affected compute node to error log 132.

In another embodiment, a compute node 112 may be configured to notify the global resource manager 126 when the compute node 112 develops a resource leak. In such a case, a local resource monitor executing on the compute node (e.g., as part of the compute node operating system kernel) may monitor resource availability. In another embodiment, the global resource manager 126 may actively search for resource leaks on idle compute nodes 112. The global resource manager 126 may perform the search by randomly sampling idle compute nodes 112. Alternatively, global resource manager 126 may poll idle compute nodes 112 in a predetermined order. When sampling idle compute nodes 112, global resource manager 126 may compare a current resource availability on a given compute node 112 with a known clean point stored on the compute node 112. Generally, a "clean point" refers to a set of resources and resource levels that should be available on a compute node 112, when no jobs are being executed on that compute node 112. If the global resource manager 126 determines that a substantial percentage of resources are unavailable, then a resource leak may exist. The exact percentage may be tailored to suit the needs of a particular case. For example, the global resource manager 126 may allow for some variance between the current resource availability and the known clean state or no variance at all. If the global resource manager 126 determines that a resource leak is present on the compute node 112, the global resource manager 126 may also determine whether a resource leak has occurred on other compute nodes 112 that have recently run the same job as the affected compute node 112. Once a resource leak has been discovered, the global resource manager 126 initiates the process described above.

Node availability data 128 identifies compute nodes 112 that are currently available to perform jobs. A compute node 112 may be listed as unavailable when a resource leak is identified. Error log 132 contains information about resource leaks and the affected compute nodes. Such information may include a reference to the affected compute node, the last job run on that compute node, the method used to correct the resource link, and other information.

Clean up procedure 130 may be configured to remove (or otherwise correct) the resource leak from the compute node 112. In one embodiment, clean up procedure 130 removes the resource leak by rebooting the compute node 112. In another embodiment, clean up procedure 130 returns the compute node 112 to a known good state derived from a stored image of a clean node-state to remove the resource leak. Of course, other corrective actions are contemplated.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
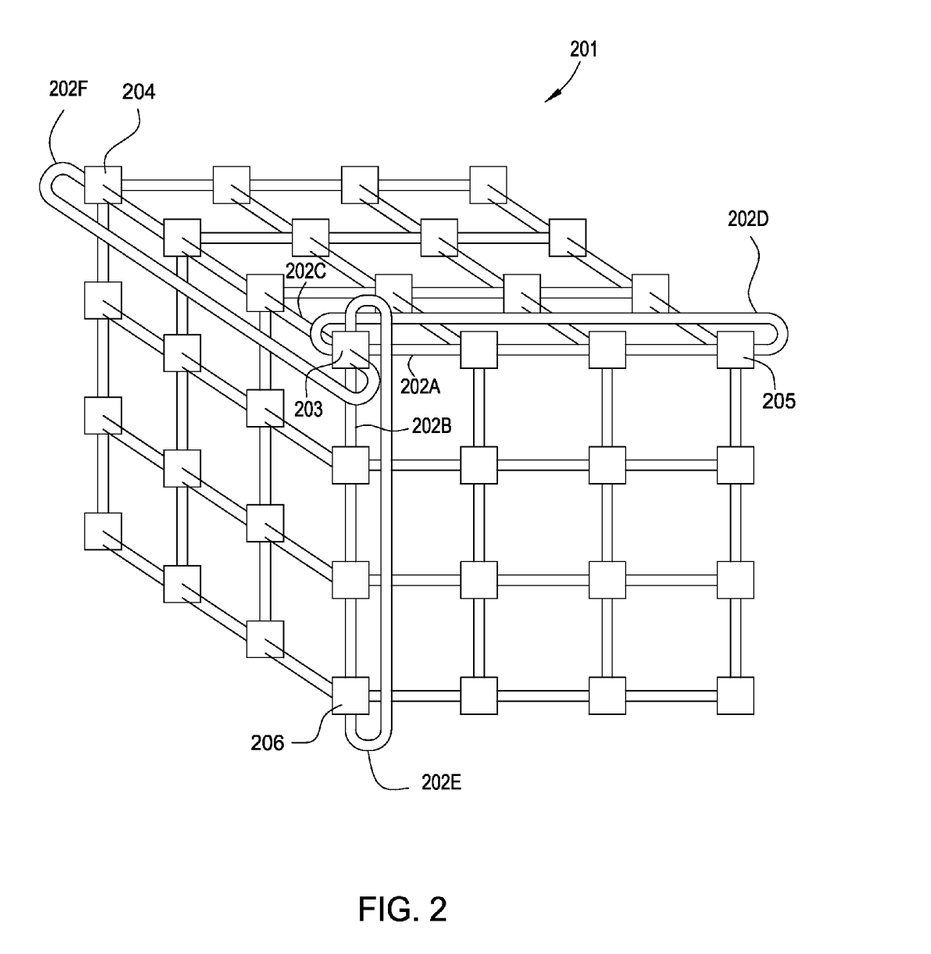
FIG. 2 is an illustration of a three dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it is understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
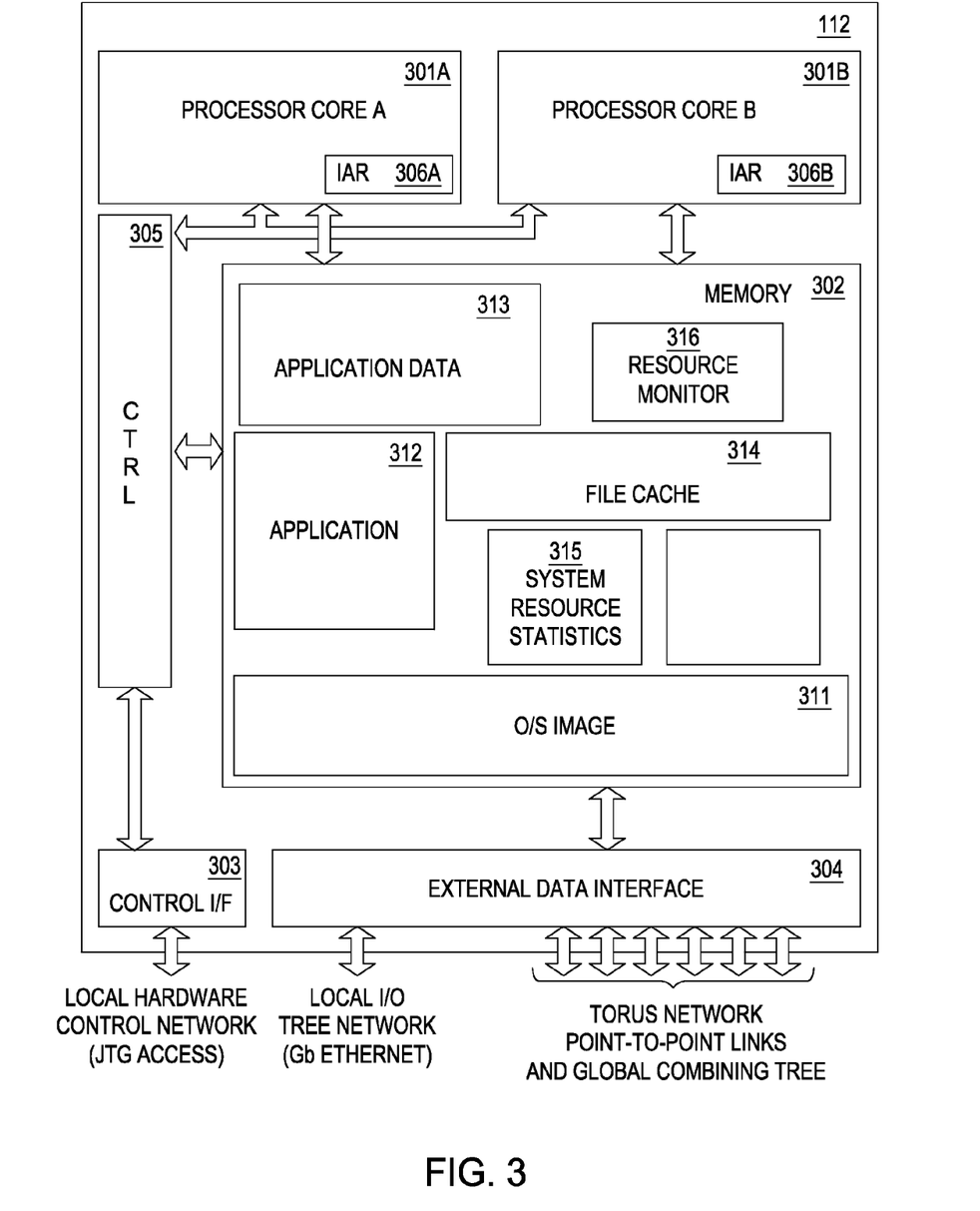
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 (e.g., functional network 105) and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application 312, user application data 313, system resource statistics 315, and resource monitor 316. Illustratively, memory 302 also includes a file cache 314, i.e., a cache of data read from or to be written to an I/O file. Operating system image 311 provides a copy of a simplified-function operating system running on compute node 112, referred to as a compute node kernel. Operating system image 311 may include a minimal set of functions required to support operation of the compute node 112, including functions used to implement the present invention.

Application 312 represents a program being executed by the compute node 112. The application 312 may be a fragment of a larger application or a complete application unto itself. Frequently, a copy of application 312 may be executed in parallel on thousands of compute nodes 112. In such a case, each copy of application 312 may perform the same computing tasks on different sets of data.

As part of ongoing operations, application 312 may be configured to transmit messages from compute node 112 to other compute nodes in parallel system 100. For example, the MPI call of MPI_Send( ); may be used by application 312 to transmit a message from one compute node to another. On the other side of the communication, the receiving compute node may use the MPI call MPI_Receive( ); to receive the message. For example, in context of the present invention, one compute node may use MPI messages to send a request to another a compute for a needed program fragment. As described above, in a Blue Gene system, the external data interface 304 transmits the MPI message by encapsulating it within a set of packets and transmitting the packets of over the torus network of point-to-point links. Other parallel systems and other parallel computing libraries use similar mechanisms for transmitting messages between different compute nodes.

The system resource statistics 315 store information about a known clean state of the compute node 112. Although shown as being stored in the memory 315 of compute node 112, the system resource statistics 315 could also be collected from multiple compute nodes 112 and transmitted on the service node 102. In such a case, the service node 102 could periodically compare the system resource statistics 315 for a given node to an expected clean state. Examples of system resource statistics 315 include information such as available memory, a number of running processes, and available disk space, number of open (or temporary) files, and the like. In one embodiment, the information stored in system resource statistics 315 is determined from the compute nodes 112 after booting, but prior to performing any computing jobs.

The resource monitor 316 may be a daemon or routines included in operating system image 311. In one embodiment, the resource monitor 316 collects an initial set of data reflecting the resources available on the compute node 112 as part of an initial program load (i.e., as part of the boot process). After the compute node 112 completes a job (or jobs) and performs any clean-up (e.g. freeing allocated memory, deleting any temporary files, tearing down or releasing any network communication links etc.), the resource monitor 316 may compare the resources then currently available with the system resource statistics 315. If resource monitor 316 determines that a resource leak is present on the compute node 112, the resource monitor 316 may be configured to invoke a corrective action to remove (or correct) the resource leak. For example, resource monitor 316 may notify the global resource monitor 126 to invoke clean up procedure 130. Alternatively, the compute node 112 may be configured to be "self-correcting." For example, the resource monitor 316 may be configured to identify and remove any orphaned files or temporary files created by a process, release communication links, empty network communication buffers or tear down a communication link established while the application was executing the job. Alternatively, the compute node 112 may simply shutdown and reboot after sending log data to service node 102. Once the resource leak is corrected, the resource monitor 316 may repeat the process as additional jobs are submitted.

Figure 4:
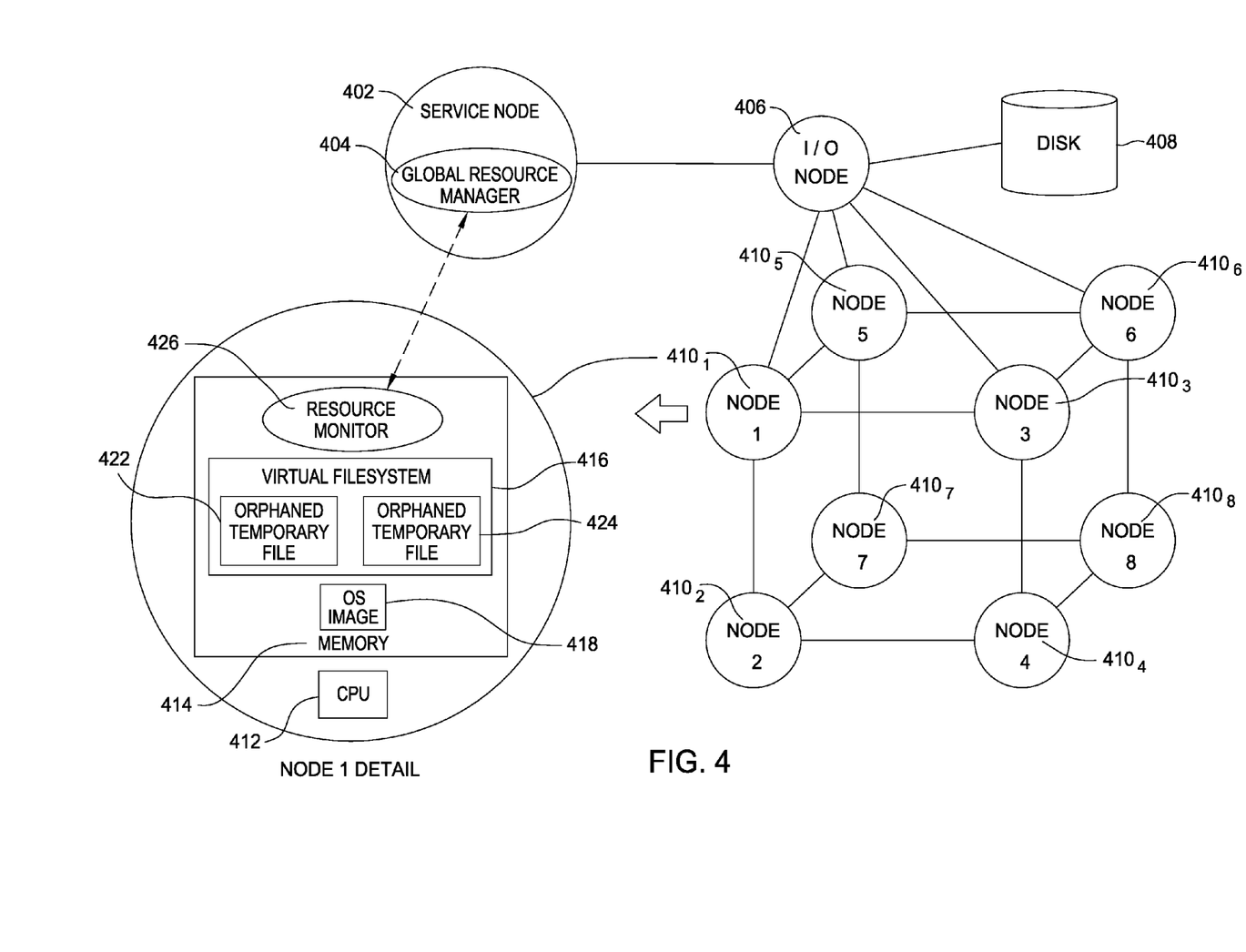
FIG. 4 illustrates an example of a node recovering from a resource leak, according to one embodiment of the invention.

FIG. 4 illustrates an example of a compute node recovering from a resource leak, according to one embodiment of the invention. FIG. 4 shows a simple multi-node system that includes a service node 402, an I/O node 406, disk 408, and eight compute nodes $410_1$-$410_8$. In addition, the service node 402 includes a global resource manager 404 and each compute node (as illustrated by compute node $410_1$) includes a CPU 412 and a memory 414. Memory 414 stores a virtual filesystem 416, an operating system image 418, and a resource monitor 426. Illustratively, the virtual file system 416 includes two orphaned temporary files 422 and 424. As is known, a virtual file system may provide a storage container that functions like a physical storage device (e.g., a disk-drive) constructed from computer memory.

As shown, a resource leak exists on compute node $410_1$. In this instance, orphaned temporary files 422 and 424 represent the resource leak. In one embodiment, the resource monitor 426 on compute node $410_1$ identifies the resource leak and contacts the global resource manager 404 on service node 402 to remove the resource leak. Once contacted, the global resource manager 404 performs a corrective action to restore compute node $410_1$ to a "clean" state. In one embodiment, the global resource manager 404 also removes compute node $410_1$ from a pool of available nodes and perform a corrective action to remove orphaned temporary file 422 and 424. Once the node $410_1$ is restored to a clean state, the global resource manager 404 returns node $410_1$ to the pool of available nodes.

In another embodiment, global resource manager 404 contacts compute node $410_1$ to determine whether a resource leak has occurred. For example, the global resource manager 404 may obtain resource availability data describing both a clean state and a current state of compute node $410_1$. After determining that the compute node $410_1$ has a resource leak (in this case caused by the orphaned temporary file 422 and the orphaned temporary file 424), the global resource manager 404 removes compute node $410_1$ from a pool of available nodes. Further, in one embodiment, the global resource manager 404 may also determine whether other compute nodes have performed the same job as compute node $410_1$. If so, the global resource manager may determine whether a resource leak has occurred on nodes which have performed the same computing job. That is, once the global resource manager determines that an application running on one compute node is prone to resource leaks, then the global resource manger 404 may monitor each node that executes that particular application. When active resource leaks are identified, the global resource manager 404 performs a corrective action to restore nodes in the pool to a "clean" state once a leak has been identified. For example, the resource manager may identify that orphaned temporary files 422 and 424 are not associated with any running process and should be deleted. Once a compute node is restored to a clean state, the global resource manager 404 returns that nodes to the pool of available nodes.

Figure 5:
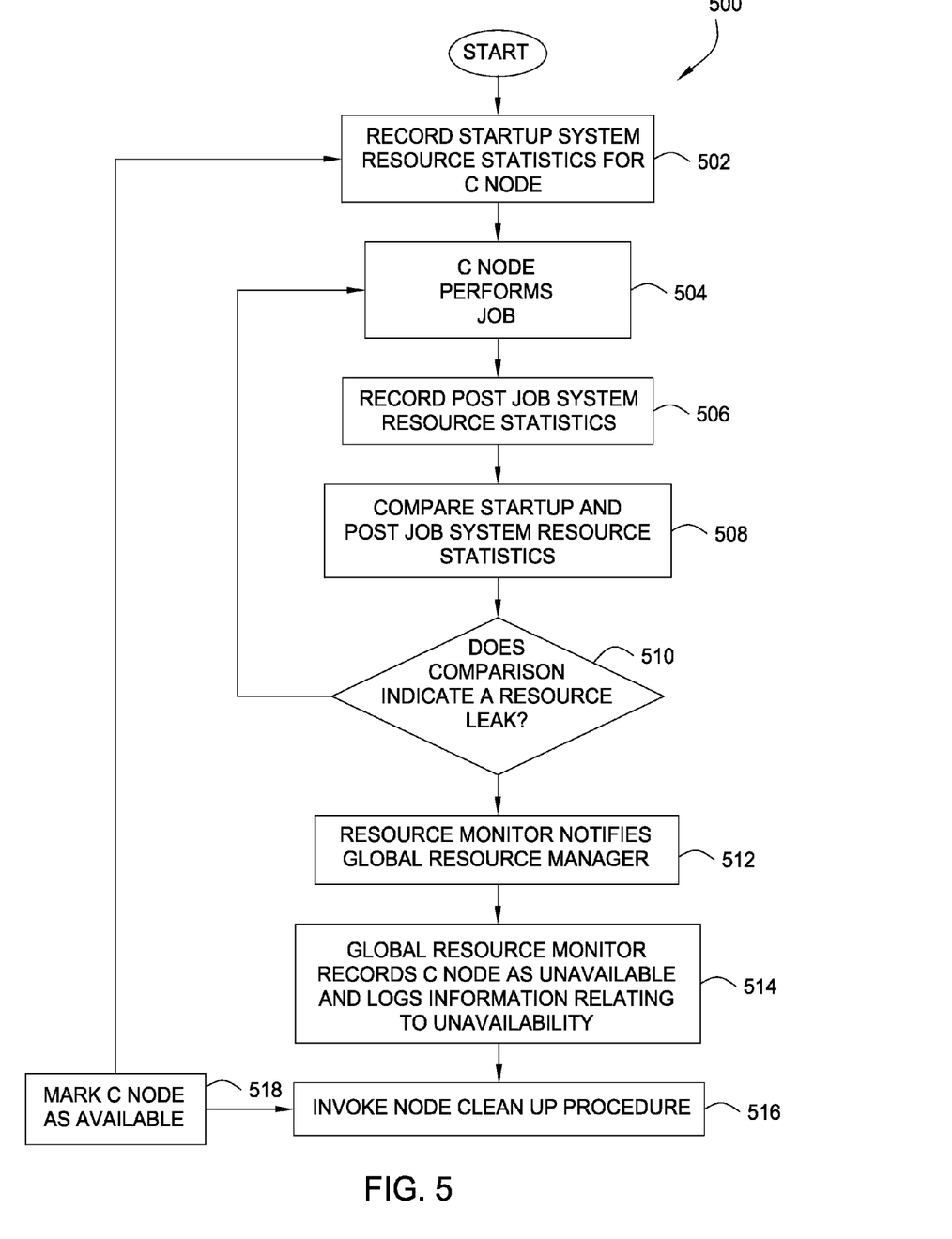
FIG. 5 is a flow diagram illustrating a method for recovering from a resource leak on a compute node of a multi-node computer system, according to one embodiment of the invention.

FIG. 5 is a flow diagram illustrating a method 500 for recovering from a resource leak on a compute node of a multi-node computer system, according to one embodiment of the invention. As shown, the method 500 begins at step 502 where a resource monitor records information about what system resources are available on the compute node. The system resource information could be recorded at boot-time or other clean point. Using the scenario described above as an example, the resource monitor could record the number of current processes running, the size of the virtual filesystem, the amount of available memory, etc. At step 504, the compute node performs one or more computing jobs. After finishing the jobs, the resource monitor may again poll the compute node to determine what system resources are available (step 506). For example, FIG. 4 illustrates a scenario were a running process has left two orphaned temporarily files 422 and 424 on a virtual file system 416. At step 508, the resource manager compares a system resource representing a clean state to the actual system state determined after the computing jobs have completed for indications of a resource leak. As stated, the resource monitor may allow for some variance between the available system resources and the "clean" state before determining that a resource leak has occurred. If the comparison does not indicate the presence of a resource leak at step 510, the method returns to step 504, where the compute node remains idle until receiving additional computing jobs to perform. Similarly, once performed, the resource monitor may again determine whether a resource leak has occurred.

If a resource leak is found at step 510, the resource monitor notifies a global resource manager (step 512). In the scenario shown in FIG. 4, the presence of the orphaned temporary files 422 and 424 may result in a resource leak being identified. For example, if the size of the files 422 and 424 result in the amount of available memory to fall below a minimum value specified for a "clean" state, the resource monitor may conclude that a resource lack has occurred. Again, the minimum value may reflect an expected variance in available memory due to ongoing operating system processes, including the operation of the resource monitor itself. At step 514, the global resource manager may remove the compute node from a pool of available nodes and record information regarding the resource leak. The information could include a reference to the affected compute node, the difference in resource availability, and the most recently processed job (or jobs). At step 516, the global resource manager invokes a corrective procedure to remove the resource leak. At step 518, the global resource manager returns the compute node to the pool of available nodes, and returns to step 502 and repeats the process.

Figure 6:
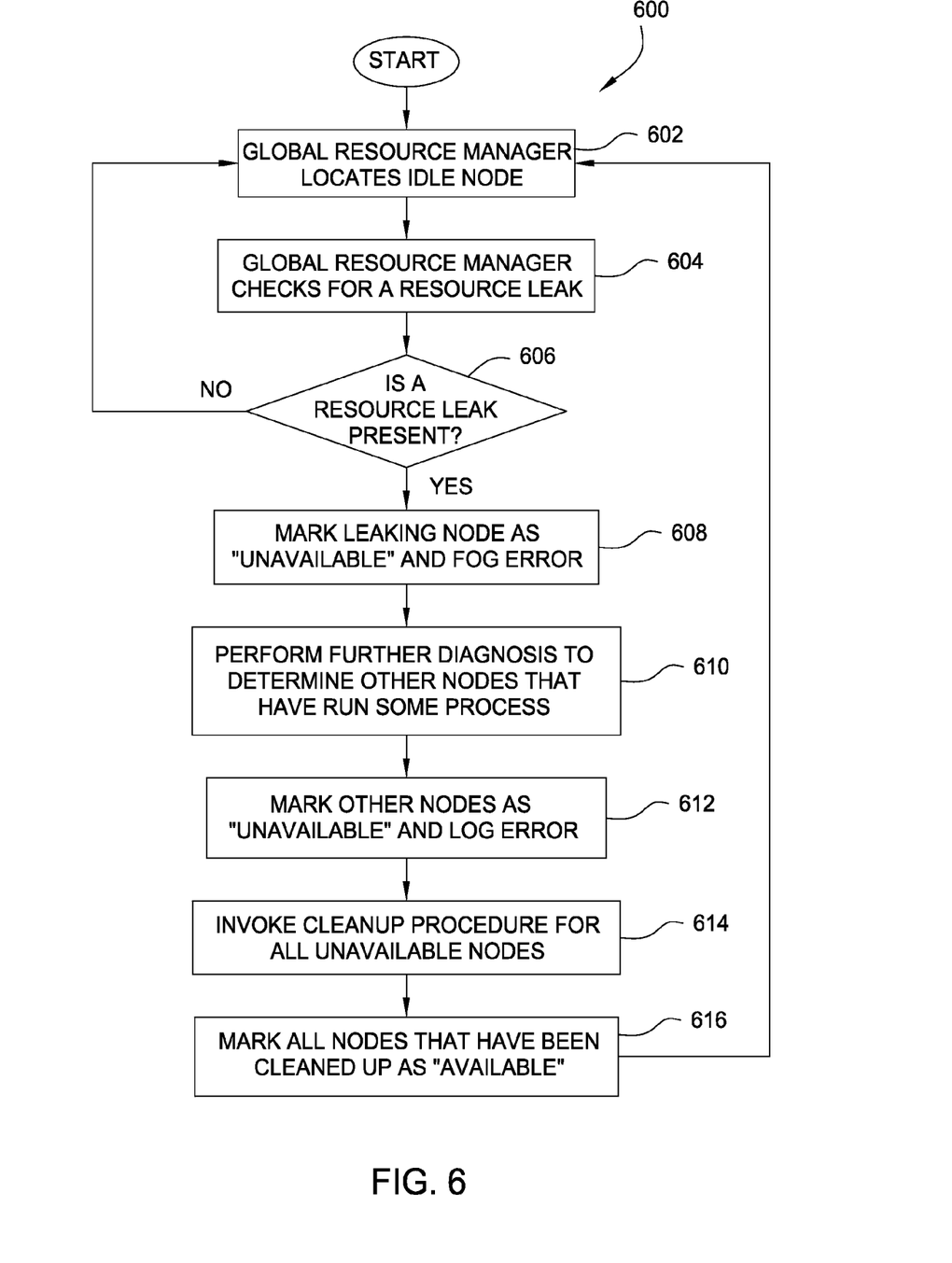
FIG. 6 is a flow diagram illustrating a method for recovering from a resource leak on a compute node (or nodes) of a multi-node computer system, according to one embodiment of the invention.

FIG. 6 is a flow diagram illustrating a method 600 for recovering from resource leaks on compute nodes of a multi-node computer system, according to one embodiment of the invention. As shown, the method 600 begins at step 602 where a global resource manager identifies an idle node to evaluate for a resource leak. Again referring to the example of FIG. 4, the global resource manager may select compute node 410$_1$ to check for a resource leak (assuming this node is, in fact, idle). At step 604, the global resource manager may compare the current resource availability on the selected node with a known clean state for that node. At step 606, the global resource manager determines whether there a resource leak has occurred, based on the comparison. For example, this may include considering information about the two orphaned temporarily files. If no resource leak is present, the method 600 returns to step 602 and repeats the process with another idle node.

If a resource leak is found (step 606), the global resource manager removes the compute node from a pool of available nodes and records information regarding the resource leak (step 608). The information could include, e.g., a reference to the compute node, the difference in resource availability, and recently processed job (or jobs). Optionally, the global resource manager may determine whether other compute nodes have run the same job as a node identified has having a resource leak. If other compute node have run the same job, the resource manager may mark those compute node as needing to be evaluated to determine whether a resource leak has occurred on those nodes as well. Further, the resource manger may mark any such nodes as being unavailable to perform computing jobs (step 610). That is, the nodes may be removed from a pool of available nodes pending an evaluation for resource leaks. At step 614, the global resource manager may invoke a corrective procedure to remove the resource leak on the affected compute node. Finally, at step 616, the global resource manager returns the compute nodes to the pool of available nodes. The method 600 then returns to step 602, where the global resource manager may evaluate another idle node.

Advantageously, embodiments of the invention allow compute nodes in a parallel computing system to recover from resource leaks with minimal disruption to ongoing processing tasks. As described herein, a resource monitor may record information describing a clean state at system (or node) boot time. After the compute node performs a job, the resource monitor may compare a current state of resource availability on the compute node with the known clean state. If a resource leak is detected, the resource monitor may contact a global resource manger to remove (or correct) the resource leak. The global resource manager can remove the resource leak in several ways, including: rebooting the node, restoring a stored image of clean node state, or other methods. Once the resource leak is removed, the process begins again. In one embodiment, the global resource manager may sample idle compute nodes to identify resource leaks. In such a case, the global resource manager may remove the resource leak as previous described as well as identify other nodes that have recently run the same job as the affected node. Such nodes may then be evaluated for resource leaks as well.

While the foregoing is directed to embodiments of the present invention, other and further embodiments of the invention may be devised without departing from the basic scope thereof, and the scope thereof is determined by the claims that follow.

What is claimed is:

1. A method for correcting resource leaks that occur on a parallel computing system having a service node and a plurality of compute nodes, comprising:

by a respective resource monitor executing on each compute node, storing a resource availability level reflecting a clean state of the respective compute node, wherein the clean state of the respective compute node is characterized by an absence of resource leaks on the respective compute node;

responsive to a first compute node being programmatically selected, by a resource manager executing on the service node, to be monitored, determining, by the resource monitor executing on the first compute node, whether a resource leak has occurred on the first compute; and upon determining that a resource leak has occurred on the first compute node and by the resource monitor executing on the first compute node, notifying the resource manager that the resource leak has occurred on the first compute node, whereupon the resource manager is configured to:
  identify one or more computing jobs completed by the first compute node; and
  remove the first compute node from a pool of available compute nodes, to prevent any job from being assigned to the first compute node.

2. The method of claim 1, further comprising:
  identifying at least a second compute node, of the plurality, that also executed the identified one or more computing jobs; and
  determining whether a resource leak has occurred on the second compute node; and
  upon determining that a resource leak has occurred on the second compute node, invoking the corrective action to restore a resource availability level of the second compute node to a clean state.

3. The method of claim 1, wherein the operation further comprises:
  prior to invoking the corrective action, removing the first compute node from a pool of available compute nodes; and
  after the clean state is restored on the first compute node, returning the first compute node to the pool of available compute nodes.

4. The method of claim 1, wherein the corrective action is selected from at least one of:
  rebooting the first compute node; and
  loading a system image of the first compute node captured in the clean state.

5. The method of claim 1, wherein the resource leak includes one or more orphaned temporary files.

6. The method of claim 1, wherein the resource leak comprises a decrease in memory available on the first compute node that exceeds a predetermined threshold.

7. The method of claim 1, further comprising:
  providing the resource manager executing on the service node and, for each of the plurality of compute nodes, the respective resource monitor executing on the respective compute node, wherein the resource manager is communicably connected to each resource monitor;
  by the resource manager, determining other compute nodes likely to have resource leaks, by identifying at least a second compute node, of the plurality, that also executed the identified one or more computing jobs;
  by the resource monitor executing on the second compute node, determining whether a resource leak has occurred on the second compute node; and
  upon determining that a resource leak has occurred on the second compute node and by the resource monitor executing on the second compute node, notifying the resource manager that the resource leak has occurred on the second compute node.

8. The method of claim 7, wherein the resource manager is configured to, upon being notified by the resource manager that the resource leak has occurred on the second compute node:
  identify one or more computing jobs completed by the second compute node;
  remove the second compute node from the pool of available compute nodes, to prevent any job from being assigned to the second compute node;
  after the second compute node is removed from the pool of available compute nodes, perform a corrective action to restore the second compute node to the clean state of the second compute node; and
  after the clean state is restored on the second compute node, return the second compute node to the pool of available compute nodes, to once again allow jobs to be assigned to the second compute node.

9. A non-transitory computer-readable medium containing a program which, when executed, performs an operation for correcting resource leaks that occur on a parallel computing system having a service node and a plurality of compute nodes, the operation comprising:
  by a respective resource monitor executing on each compute node, storing a resource availability level reflecting a clean state of the respective compute node, wherein the clean state of the respective compute node is characterized by an absence of resource leaks on the respective compute node;
  responsive to a first compute node being programmatically selected, by a resource manager executing on the service node, to be monitored, determining, by the resource monitor executing on the first compute node, whether a resource leak has occurred on the first compute; and
  upon determining that a resource leak has occurred on the first compute node and by the resource monitor executing on the first compute node, notifying the resource manager that the resource leak has occurred on the first compute node, whereupon the resource manager is configured to:
    identify one or more computing jobs completed by the first compute node; and
    remove the first compute node from a pool of available compute nodes, to prevent any job from being assigned to the first compute node.

10. The computer-readable storage medium of claim 9, wherein the operation further comprises:
  identifying at least a second compute node, of the plurality, that also executed the identified one or more computing jobs;
  determining whether a resource leak has occurred on the second compute node; and
  upon determining that a resource leak has occurred on the second compute node, invoking the corrective action to restore a resource availability level of the second compute node to a clean state.

11. The computer-readable storage medium of claim 9, wherein the operation further comprises:
  prior to invoking the corrective action, removing the first compute node from a pool of available compute nodes; and
  after the clean state is restored on the first compute node, returning the first compute node to the pool of available compute nodes.

12. The computer-readable storage medium of claim 9, wherein the corrective action is selected from at least one of:
  rebooting the first compute node; and
  loading a system image of the first compute node captured in the clean state.

13. The computer-readable storage medium of claim 9, wherein the resource leak includes one or more orphaned temporary files.

14. The computer-readable storage medium of claim 9, wherein the resource leak comprises a decrease in memory available on the first compute node that exceeds a predetermined threshold.

15. A parallel computing system, comprising:
a service node having a computer processor and a memory;
a plurality of compute nodes, each having at least a computer processor and a memory;
a program which, when executed on the parallel computing system, is configured to:
    by a respective resource monitor executing on each compute node, store a resource availability level reflecting a clean state of the respective compute node, wherein the clean state of the respective compute node is characterized by an absence of resource leaks on the respective compute node;
    responsive to a first compute node being programmatically selected, by a resource manager executing on the service node, to be monitored, determine, by the resource monitor executing on the first compute node, whether a resource leak has occurred on the first compute; and
    upon determining that a resource leak has occurred on the first compute node and by the resource monitor executing on the first compute node, notify the resource manager that the resource leak has occurred on the first compute node, whereupon the resource manager is configured to:
        identify one or more computing jobs completed by the first compute node; and
        remove the first compute node from a pool of available compute nodes, to prevent any job from being assigned to the first compute node.

16. The system of claim 15, wherein the program is further configured to:
    identify at least a second compute node, of the plurality, that also executed the identified one or more computing jobs;
    determine whether a resource leak has occurred on the second compute node; and
    upon determining that a resource leak has occurred on the second compute node, invoke the corrective action to restore a resource availability level of the second compute node to a clean state.

17. The system of claim 15, wherein the program is further configured to:
    prior to invoking the corrective action, remove the first compute node from a pool of available compute nodes; and
    after the clean state is restored on the first compute node, return the first compute node to the pool of available compute nodes.

18. The system of claim 15, wherein the corrective action is selected from at least one of:
    rebooting the first compute node; and
    loading a system image of the first compute node captured in the clean state.

19. The system of claim 15, wherein the resource leak includes one or more orphaned temporary files.

20. The system of claim 15, wherein the resource leak comprises a decrease in memory available on the first compute node that exceeds a predetermined threshold.

* * * * *